US 6,850,949 B2

(12) United States Patent
Warner et al.

(10) Patent No.: US 6,850,949 B2
(45) Date of Patent: Feb. 1, 2005

(54) SYSTEM AND METHOD FOR GENERATING A DYNAMIC INTERFACE VIA A COMMUNICATIONS NETWORK

(75) Inventors: Doug Warner, Bozeman, MT (US); Mike Myer, Bozeman, MT (US); Tom Abshire, Bozeman, MT (US)

(73) Assignee: Right Now Technologies, Inc., Bozeman, MT (US)

( * ) Notice: Subject to any disclaimer, the term of this patent is extended or adjusted under 35 U.S.C. 154(b) by 0 days.

(21) Appl. No.: 10/162,092

(22) Filed: Jun. 3, 2002

(65) Prior Publication Data
US 2003/0225730 A1 Dec. 4, 2003

(51) Int. Cl.[7] ............................................. G06F 7/00
(52) U.S. Cl. ..................... 707/101; 707/102; 379/88.18
(58) Field of Search ............................... 707/1, 3, 5, 4, 707/102, 200; 379/88.18, 88.01–88.04, 88.16, 201.1, 266.01, 88.22; 455/417; 345/727

(56) References Cited

U.S. PATENT DOCUMENTS

| 5,181,236 A | * | 1/1993 | LaVallee et al. | 379/88.22 |
| 5,864,605 A | * | 1/1999 | Keshav | 379/88.01 |
| 6,014,428 A | * | 1/2000 | Wolf | 379/88.11 |
| 6,061,433 A | * | 5/2000 | Polcyn et al. | 379/93.12 |
| 6,389,400 B1 | * | 5/2002 | Bushey et al. | 705/7 |
| 6,442,241 B1 | * | 8/2002 | Tsumpes | 379/45 |
| 6,487,277 B2 | * | 11/2002 | Beyda et al. | 379/88.01 |
| 6,493,428 B1 | * | 12/2002 | Hillier | 379/67.1 |
| 6,529,586 B1 | * | 3/2003 | Elvins et al. | 379/88.13 |
| 6,539,078 B1 | * | 3/2003 | Hunt et al. | 379/88.04 |
| 6,553,113 B1 | * | 4/2003 | Dhir et al. | 379/265.02 |
| 6,563,911 B2 | * | 5/2003 | Mahoney | 379/88.03 |
| 6,594,484 B1 | * | 7/2003 | Hitchings, Jr. | 379/67.1 |

* cited by examiner

Primary Examiner—Greta Robinson
Assistant Examiner—Miranda Le
(74) Attorney, Agent, or Firm—Shook Hardy & Bacon

(57) ABSTRACT

A system, method, and computer program product for dynamically adapting selections in an automatic phone support system is described. The invention may integrate a dynamic knowledge base of responses with the menu selections on an automated phone system or other response system to present the most frequently used items earlier in the option list, or otherwise order options and information. Call data may be captured from single callers or historical ensembles of callers. An automatically generated similarity relationship may be used to initialize the system without historical call data, based on textual similarity or other techniques. Prioritization of options provides a more enjoyable, efficient experience for callers without increasing administrative overhead.

8 Claims, 3 Drawing Sheets

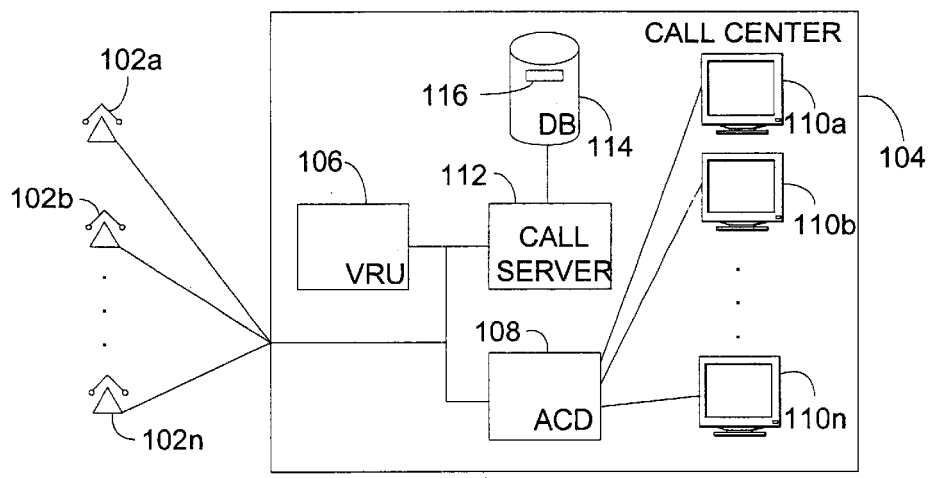
FIG. 1
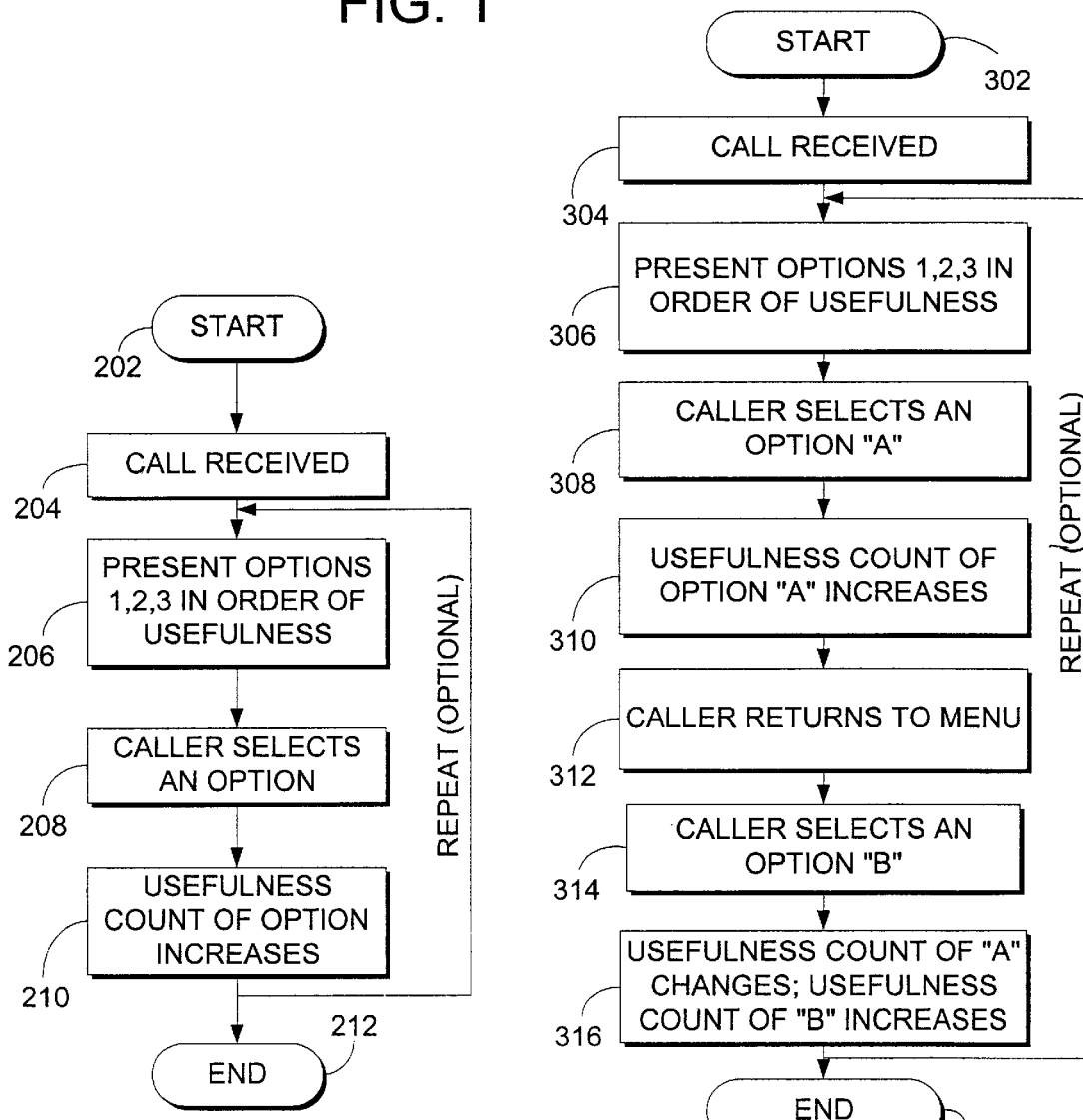
FIG. 2
FIG. 3

SYSTEM AND METHOD FOR GENERATING A DYNAMIC INTERFACE VIA A COMMUNICATIONS NETWORK

FIELD OF THE INVENTION

The invention relates generally to the field of communications, and more particularly to automated telephone and other telecommunications services.

BACKGROUND OF THE INVENTION

Telephone response systems, such as automated voice response units (VRUs) or others, raditionally rely on a human administrator to design the orderings of menus and information within the system. Thus, if the database and search logic are not properly installed, programmed or maintained, the familiar "Press 1 for billing inquiries, press 2 for order status . . . " sequence may for instance require most callers to exhaust an entire list of options before reaching their desired selection. While techniques exist to make these systems easier to use by allowing voice rather than keypad entry of menu selections, there is no method to dynamically adjust the interface hierarchy based on caller usage.

As described in pending patents: Ser. No. 09/549,566 (entitled "Temporal Updates of Relevancy Rating of Retrieved Information in an Information Search System"); Ser. No. 09/549,669 (entitled "Implicit Rating of Retrieved Information in an Information Search System"); Ser. No. 09/549,568 (entitled "Usage Based Strength Between Related Information in an Information Retrieval System"); Ser. No. 09/751,934 (entitled "Automated Adaptive Classification System for Bayesian Knowledge Networks"); and provisional 60/314,796 (entitled "Method for Clustering Automation and Classification"), techniques exist where the information presented to users of a computer or Internet based question answering system changes dynamically, based on usage.

Such adaptive techniques have not however been incorporated into automated telephone systems, affecting the efficiency and user-friendliness of that type of support platform. Other problems exist.

SUMMARY OF THE INVENTION

The invention overcoming these and other problems in the art relates in one regard to a system and method for presenting a dynamic interactive interface to a user over a telecommunications network, for instance a wired or wireless telephone network. In an embodiment, the invention may be deployed, for instance, in a customer service department of a company that employs an automated phone system to provide answers to frequently asked questions. By incorporating the invention in such an automated phone or other system, callers can reach their desired information more quickly and with fewer inputs, without increasing administrative overhead. Historically telephone support systems may have caused customer dissatisfaction because of their lack of user-friendliness. However, the invention solves many of these problems while increasing system responsiveness.

In one aspect of the invention, the interactive selections made by callers in response to a voice or other menu may be captured and stored, for instance in a database. Data about those captured selections, such as their frequencies, times of day, duration and other parameters may be used to reconfigure the menu sequence, for instance so that menu selections which are historically made more frequently may be moved higher in the list for subsequent callers. Data may be captured from single callers, selected groups of callers or historical ensembles of all callers.

Thus, as each new caller selects an option, a usage counter on that menu item may for example increase. As each new caller bypasses that option to proceed to a subsequent peer level menu item the usage counter on the first item may in embodiments decrease. Over time, the menu items that have the highest visitation frequency may accumulate higher associated counts. The system may then present the menu options in revised order from the highest usage to the lowest usage, resulting in the most frequently selected options appearing earlier in the option listings.

In another aspect of the invention, the transitions between menu items may be captured and stored. These transitions may then be presented to subsequent callers as suggested options. In this regard, each transition from one menu option to another suggests that a caller finds those options related. As subsequent callers make the same transition, a usefulness counter may for instance be incremented on that transition to signify the strength of the relationship between the two options. In other embodiments, a directed graph connecting the two menu items may have an associated weight adjusted, such as in a Bayesian network. The system may then present a rank ordering of related menu options to callers who may otherwise have difficulty finding the desired option.

In another aspect of the invention, the usefulness rankings of each menu option and/or each menu option relationship, as described above, may be algorithmically decreased based on the last time the option was used. The invention in this regard may allow the menu options which have the most current interest to appear earlier in the list, while those options that were historically important but not currently useful may be moved further down the list.

In another aspect of the invention, when no caller usage data exists, such as in a recently initialized system, to allow the presentation of relationships between menu options, a method is available to automatically create relationships between similar items. In this embodiment the textual similarity between the contents of each menu item are analyzed and similar items may be related with a strength proportional to the relationship.

In another aspect of the invention, an automatic determination of the complete menu hierarchy may be generated. In this embodiment, the entire set of potential content to present in an automated telephone system may be analyzed for similarity and topic-subtopic relationships. The result is a dynamic creation of a complete menu system built by conceptual relationships. As new content is added to the system, options may be automatically added at the proper point within the menu hierarchy. Or, new content may be sufficiently distinct to cause a new hierarchy to be generated.

BRIEF DESCRIPTION OF THE DRAWINGS

The invention will be described in detail below with reference to the attached drawing figures, in which like elements are referenced by like numbers, and in which:

FIG. 1 illustrates a telephone support environment in which an embodiment of the invention may operate.

FIG. 2 illustrates call processing in a dynamic telephone menu system according to an embodiment of the invention.

FIG. 3 illustrates call processing in a dynamic telephone menu system, according to an embodiment of the invention.

DETAILED DESCRIPTION OF PREFERRED EMBODIMENTS

Figure 4:
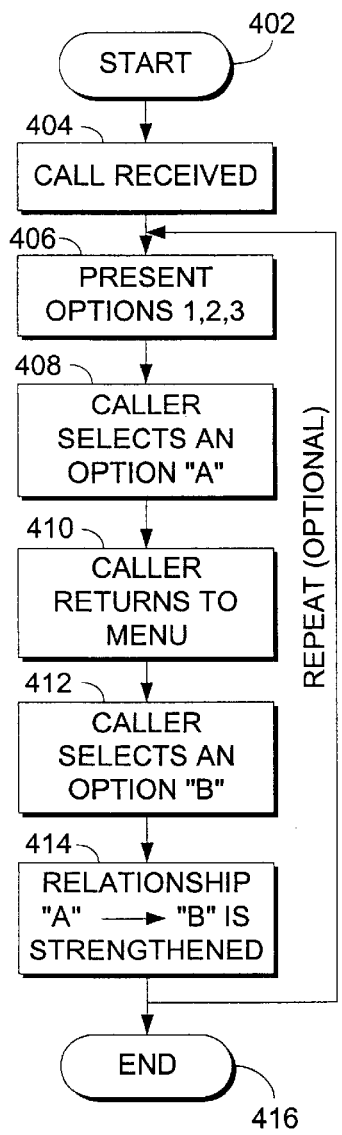
FIG. 4 illustrates generation of related menu choices by caller use, according to an embodiment of the invention.

The invention in one regard relates to a system and method for presenting a dynamic interface over a telecommunications network, for instance a voice menu over a telephone system. For illustrative purposes, an embodiment of the invention is discussed below with reference to a customer support department that uses an automatic (self-service) phone answering system as a platform for customer communication and support. This is only an example of an operating environment, and is not intended to suggest any limitation in the scope of using or functionality of the invention. Neither should it be interpreted as implying any dependency or necessity of any one or combination of components illustrated in the exemplary operating environment.

FIG. 1 illustrates one such operating environment for an embodiment of the invention, in which one or more callers may use one or more transmission devices 102a, 102b . . . 102n (n arbitrary) to communicate with a call center 104, for instance to inquire about customer support, warranty, financial, billing or other information. The transmission devices 102a, 102b . . . 102n may each be or include, for instance, conventional telephones communicating via plain old telephone service (POTS), wireless cellular phones or other mobile devices, voice over Internet Protocol (VoIP) clients, telephones connected via DSL or ISDN lines, or other communication devices. The call center 104 may include a voice response unit 106, which may be capable of presenting callers with an automated voice menu. The voice menu may for instance be or include recorded human voices, or synthetic voices in different embodiments. Voice response unit 106 may for instance accept keypad inputs, voice or other inputs or responses from callers. The call center 104 may include an automatic call distributor 108 which may distribute incoming calls, selected calls or classes of calls from the one or more transmission devices 102a, 102b . . . 102n to at least one of customer support stations 110a, 110b . . . 110n (n arbitrary). Customer support stations 110a, 110b . . . 110n may for example be or include computer workstations attended by human operators.

The call center 104 may also include a call server 112, communicating with voice response unit 106 and automatic call distributor 108. Call server 112 may likewise communicate with database 114, for instance to access and store user account information, incoming or outgoing call time, duration, caller inputs and other parameters.

FIG. 2 illustrates interactive processing to present a voice menu interface according to an embodiment of the invention. Processing may begin at step 202. In this embodiment, a call may be received in step 204, for instance from a caller using one of transmission devices 102a, 102b . . . 102n to connect with a dynamic phone menu, presented by voice response unit 106 or otherwise. The caller may be presented with an audible list of selectable items or options available on the system in step 206. These might be, for example, "Support for my Widget" and "Support for my Gadget" with for example the first item representing the option which callers have historically chosen most frequently.

The audible menu sequence may in embodiments be interruptable, for instance by keypad or voice input, when a caller wants to supply a selection or other information while a menu item is playing. In embodiments, voice menu items may be simultaneously or alternatively presented via a text or graphical interface, for instance on the screen of a cellular phone having short message service (SMS) or other messaging capability, or otherwise.

The caller may select one of the two or more "Widget", "Gadget" or other menu items in step 208. When selected, a usefulness score stored in a usefulness counter 116, for instance stored in database 114, for that item may be increased after the selection, in step 210. Should this selection cause a lower ranking menu item to receive a higher usefulness ranking than another item, that item may be elevated to an earlier point in the menu sequence for subsequent callers. In the illustrative case, the "Widget" item might for example have a usefulness score of 4 and "Gadget" might have a usefulness score of 3. The caller may accordingly be presented with "Widget" first, and "Gadget" second. Selecting "Gadget" may cause the "Gadget" item to increase to a usefulness score of, for example, 5, and the next caller may be presented with "Gadget" first and "Widget" second. Other scoring and ordering schemes may be used. In step 212, processing ends.

FIG. 3 illustrates another call interaction, along the same general lines as that illustrated in FIG. 2. Processing may begin in step 302. A call may be received in step 304, followed by option presentation in step 306 and the caller selecting an item, illustratively item "A", in step 308. In this embodiment, after the caller selects one item that was ordered on usefulness, the usefulness counter 116 for that item ("A") may likewise be increased in step 310. The caller may then return to the original menu as part of the same call, in step 312. The menu list may be rank ordered based on all available usage information at the time. The caller may subsequently select a different item in step 314, illustratively item "B". In step 316, the usefulness count of item "A" may be changed, for instance decreased to reflect the skipping over of that item, while the usefulness count of item "B" may increase. Selecting the new item may cause the prior selected item's usefulness score to decrease, and increase the current item's usefulness score. In embodiments, that action may cause some or all prior items in the same call to decrease in score as well. Processing may repeat through different menu items, and if not in step 318 processing may end.

In embodiments, the decrease in score or rank on a prior item or items generated for instance according to the process illustrated in FIG. 3 may cause the item to receive either a lower value than it had before the original interaction, a value equal to the value before the original interaction, or a value greater than the original value before the initial interaction, depending on implementation. In this case, the system may have a "Widget" item with for example a score of 4 and "Gadget" item with a score of 3. A caller initially selecting the "Gadget" item as an option may cause the "Gadget" score to increase to 5. Subsequently, the same caller may select the "Widget" item. "Widget" may then increase to a score of 6, while "Gadget" may then decrease to 4. Numbers used for increasing or decreasing a score may vary depending on implementation. For instance, values by which a score increases may be greater than or equal to that by which they decrease, or either may be made a function of the current item score, or of other parameters. Whole number, binary, decimal or other values may be used for scores, in different embodiments.

FIG. 4 illustrates an interactive process in which relationships between information items in a telephone response system are generated, according to an embodiment of the invention. In this embodiment, processing may begin in step 402, and a call may be received in step 404. For instance a caller may connect with a voice menu presented by voice response unit 106 or otherwise. Menu items may be presented as options in step 406, and a user may select an item in step 408, for instance by spoken input decoded by voice recognition or keypad input, and select an information item, such as a checking account balance. Subsequently, in step 410 the caller may return to the same or a different menu and select a different information item in step 412, for instance a savings account balance. The system may detect that this caller has visited two information items in order, and build or strengthen an ordered or unordered relationship between these two items in step 414. The relationship may be represented, for instance, by a normalized weighting score or otherwise. The system may similarly build relationships between any two or more items in immediate sequence, or between any two or more items in the history of the call or prior calls, of that caller or others.

Figure 5:
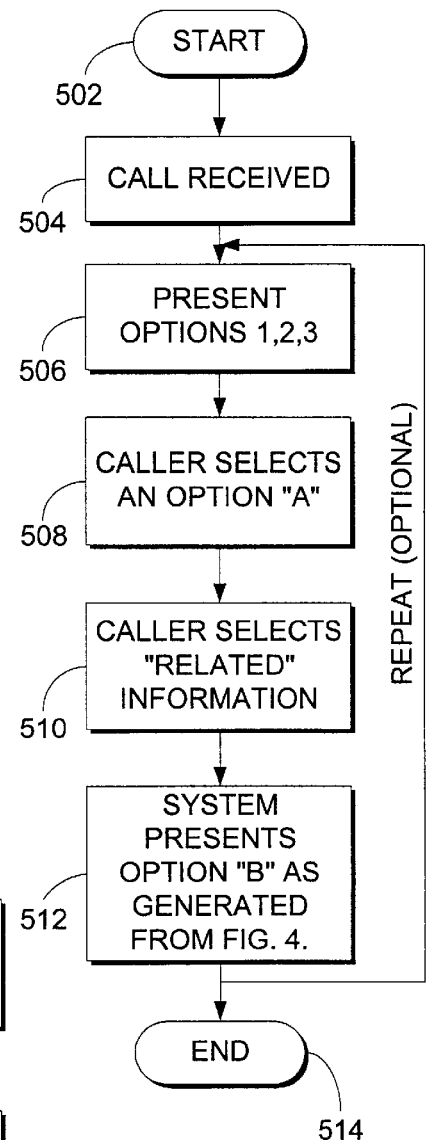
FIG. 5 illustrates the use of relationships generated as in FIG. 4, according to an embodiment of the invention.

FIG. 5 shows an embodiment illustrating how a caller may interact with menu item relationships generated according to the embodiment illustrated in FIG. 4. Processing may begin in step 502, and a call may be received in step 504. A caller may for instance connect with a voice menu in step 506, and in step 508 the caller may select an information item, for example the "Widget" item. After listening to the information item, in step 510 the caller may be presented with the option of listening to a related item, for instance the "Gadget" item as for instance discussed in the example related to FIG. 3. In step 512, the system may present an item determined to be related to the selected item, according to the process illustrated in FIG. 3 or otherwise. The caller may in embodiments be given a choice between all related items, or only the most related item, the three most closely related items, or items related in other ways. In embodiments, a caller's past set of menu selections may be stored in database 116 or otherwise, for selection, retrieval, modification or other purposes. Processing may repeat for different menu items. In step 514, processing may end.

Figure 6:
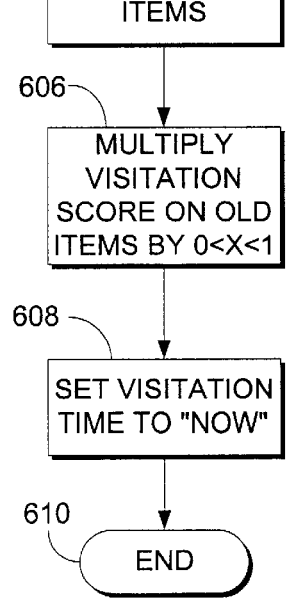
FIG. 6 illustrates an automatic aging of usefulness information, according to an embodiment of the invention.

FIG. 6 illustrates a method for decreasing the visitation score on "old" items, as for instance shown in FIGS. 2, 3 and 4 or otherwise. In this regard, "old" may refer to any item that has been visited prior to the current call. In step 602, processing may begin. In step 604, "old" items may be detected for a given caller or otherwise. The measure of what is "old" may be a configurable parameter, or may be statistically derived from the system information, for instance call data captured in database 114. Visitation times may be kept associated with usefulness or relatedness scores previously described, or otherwise. In embodiments, once an item is detected to be older than a desired age, the usefulness score of that item may be decreased in a step 606 by multiplying by an adjustment factor, for instance between 0 and 1 (inclusive), or otherwise. Items so modified may also have their visitation time updated to the current time in step 608, to signify that they have been recently manipulated. In step 610, processing may end.

Figure 7:
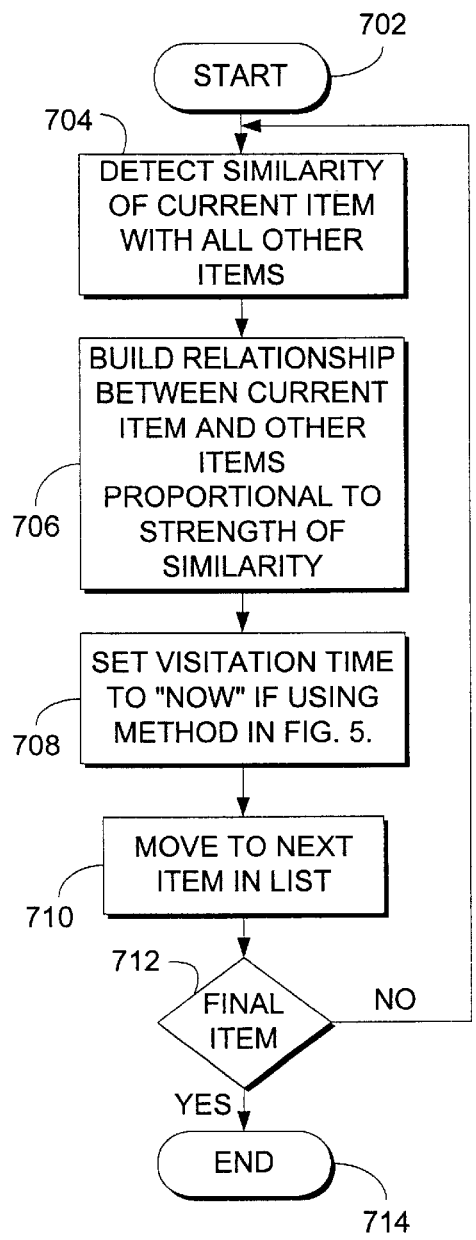
FIG. 7 illustrates call processing for automatic generation of relationships, according to an embodiment of the invention.

FIG. 7 illustrates how item relationships for instance generated according to the embodiment of FIG. 5 may be automatically generated to indicate a similarity relationship, without necessarily operating on historical call data. In step 702, processing may begin. In step 704, a similarity score may be detected indicating a similarity between a currently selected item and some or all other menu items. These automatically generated relationships may be used for example to start a newly initialized system, or applied to systems which are already operating. Similarly, systems whose set of information items change over time may in embodiments use this initializing feature to augment item relationships generated by human callers, for example because those new relationships may be sparse during the break-in period for new items. In embodiments, the relationship score between each item and every other item may be generated in pairwise fashion. These relationships may for instance be generated by matching the text from the content of each item, by correlating item types or hierarchical locations in a menu, or by other techniques. In step 706, a relationship between a current item and some or all other items may be generated according to the strength of the similarity score.

The score associated with an item relationship may for instance be a function of the degree of relatedness between the item pair. If the pair is deemed sufficiently unrelated, no usefulness score, or a zero score, may be generated for that pair. Once the score for a pair relationship is generated, if the process illustrated in FIG. 6 is used, in step 708 the caller visitation time may be calculated appropriately. In step 710 processing may proceed to a next item in the menu. This process may be repeated until all potential relationships have been examined, testing for the final item in step 712. This process may exhaustively evaluate all item pairs in the database, or in embodiments may include an optimization to eliminate some pairs from consideration, for instance those with no possible relation. Any clustering algorithm which allows pairwise consideration of information items may be employed in this process. In step 714, processing may end.

Figure 8:
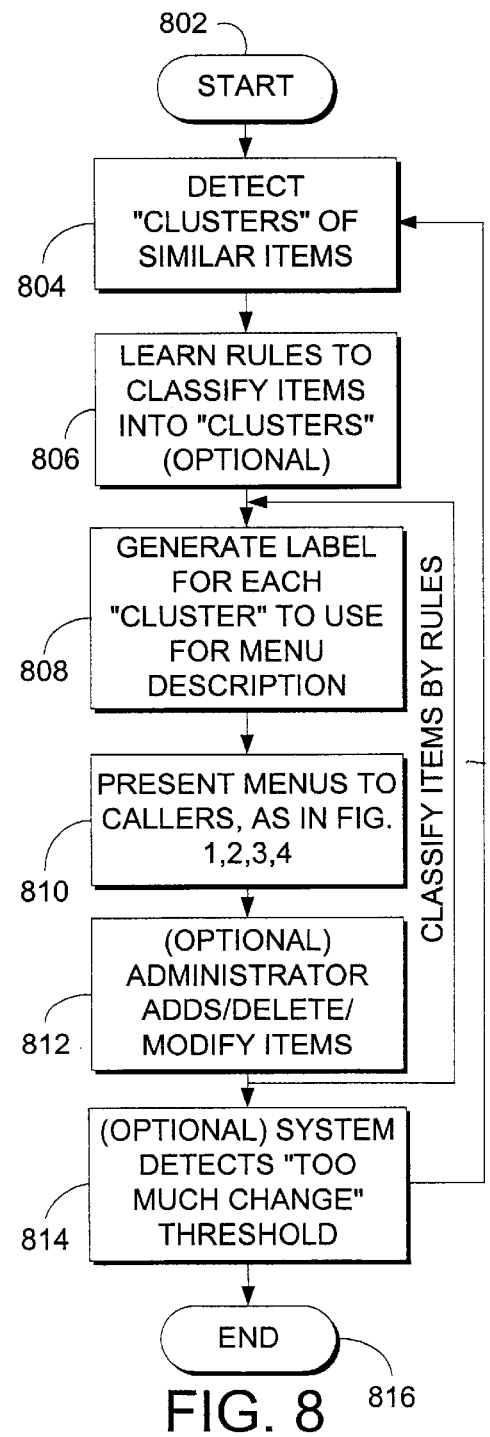
FIG. 8 illustrates processing for automatic generation of phone system menu groupings, according to an embodiment of the invention.

FIG. 8 illustrates processing that may be used to generate a clustered menu structure based on examination of component information items, according to an embodiment of the invention. In step 802, processing may begin. In step 804, clusters of similar items in the menu space may be detected. Detection may be accomplished using a clustering algorithm to generate groups of similar items. In embodiments, the clustering algorithm may generate a hierarchical result, but this is not required in the general case. Upon completion of clustering, a set of classification rules to allow categorization of new information items may optionally be installed in step 806. This may allow the system to change the number and content of information items, without changing the menu groupings generated by the clustering process. A label may be generated in step 808, to associate with the item groupings to provide a descriptive label for each menu item generated in the clustering in step 804.

In step 810, menus may be made available for presentation to callers as in embodiments shown in FIGS. 2, 3, 4, and 5 or otherwise. If desired, the system may support operations such as the addition of new items, deletion of existing items, or changing of existing items as shown in step 812. Deletion of an item may remove it as a possible menu selection. On addition or change of an item, the previously learned classification rules may be applied to the new or modified items to determine the placement of the item in the menu hierarchy. These changes to the menu sequence or content may require a re-generation of labels for affected menu categories, and a return to labeling or other processing steps.

Additionally, as an optional process, in step 814 the system may detect when a threshold of acceptable change in the information items in the menu system has been exceeded, in which case the process may automatically repeat from the clustering step. In step 816, processing may end.

One step which may be included (not illustrated in FIG. 8) is to apply a heuristic or other optimization to the menu structure based on other desired parameters, such as total number of options presented at one time (for example, between 2 and 9 to allow single keystroke selection), total number of menu selections necessary to reach an item (for example, information items must be available within no more than 3 menu selection operations), or other hierarchical or other optimizations or rules. For instance, in an embodiment the call center 104 may detect the area code or telephone number of a call, as well as the time and date of a call, using for instance Caller ID or automatic number identification (ANI) or other protocols, and use that data as a selector into a menu type, plaint in a menu sequence, to adjust scores on usefulness, relatedness or other parameters, or for other purposes.

The foregoing description is illustrative, and variations in configuration and implementation may occur to persons skilled in the art. For instance, while the invention has been generally described in terms of a caller accessing a single menu sequence generated by a single voice response unit, in embodiments multiple menus may be presented, in serial or contingent fashion, which in embodiments may be generated by multiple voice response units or other platforms.

Likewise, while the invention has been described generally in terms of a telephone-type connection over which keypad or voice inputs may select items from a menu, in embodiments other inputs or selectors may be used, for instance keyboard inputs from a computer when communication takes place via VoIP or other protocols. Furthermore, while the menu has been generally described as being presented as a sequence of audible voice messages, in embodiments concurrent or separate graphical or textual presentation of some or all of a menu may be implemented, for instance via a teletype (TTY) interface to a telephone, or via a graphical presentation of menu items on a screen of a cellular phone, with or without simultaneous voice presentation.

For further example, while the invention has generally been described as involving an automated response to a caller using a voice response unit 106 and other resources, in embodiments a given call may be first handled by distribution to one of workstations 110a, 110b . . . 110n for human intervention first, followed by automated handling, or the call may be transferred from automated processing by the voice response unit 106 to one of workstations 110a, 111b . . . 110n alter a predetermined time, or based on user input. The scope of the invention is accordingly intended to be limited only by the following claims.

What is claimed:

1. A system for configuring an interactive voice menu, said voice menu including a plurality of items, said system comprising:

a first interface configured to communicate with at least one caller via a telecommunications network; and a processor comprising a voice response unit, said voice response unit generating said voice menu and receiving an input via said first interface to select at least one item in said voice menu, wherein said voice menu is ordered according to at least one of an automatically generated similarity relationship, historical call data, and input received via the first interface during a current call, and wherein each item has at least one associated score, said score comprising at least one of a usefulness score, a visitation score and a relatedness score, said relatedness score reflecting a measure of relatedness between each item and at least one other item, and wherein said relatedness score is calculated based on at least one of the automatically generated similarity relationship and historical frequency of the item being selected before or after selection of another item, and wherein said processor is capable of adjusting the ordering of said voice menu according to at least one of the automatically generated similarity relationship, the historical call data, the input received via the first interface, and the associated scores of the items.

2. A system according to claim 1, wherein said first interface comprises at least one of a wired telephone connection, a wireless telephone connection and a networked data connection.

3. A system according to claim 1, wherein the input received via said first input comprises at least one of a voice input, a keypad input and a keyboard input.

4. A system according to claim 1, wherein said processor generates a clustering of items within the voice menu according to at least one clustering rule.

5. A method for configuring an interactive voice menu, said voice menu including a plurality of items, comprising:

communicating with at least one caller via a telecommunications network;

generating a voice menu using a voice response unit, wherein said voice menu is ordered according to at least one of an automatically generated similarity relationship, historical call data and input received during the step of communicating, and wherein each item has at least one associated score, said score comprising at least one of a usefulness score, a visitation score and a relatedness score, the relatedness score reflecting a measure of relatedness between each item and at least one other item, and wherein said relatedness score is calculated based on at least one of the automatically generated similarity relationship and the historical frequency of the item being selected before or after selection of another item;

receiving an input to select at least one item in the voice menu;

adjusting the ordering of said voice menu according to at least one of the automatically generated similarity relationship, the historical call data, the input and the associated scores of the items.

6. A method according to claim 5, wherein the step of communicating comprises communicating via at least one of a wired telephone connection, a wireless telephone connection and a networked data connection.

7. A method according to claim 5, wherein the input is at least one of a voice input, a keypad input and a keyboard input.

8. A method according to claim 5, further comprising a step of generating a clustering of items within the voice menu according to at least one clustering rule.

* * * * *